United States Patent [19]

Koyama

[11] 4,234,997
[45] Nov. 25, 1980

[54] METHOD AND APPARATUS FOR SPLITTING A BODY OF A BUTCHERED ANIMAL INTO TWO HALVES ALONG THE SPINE

[76] Inventor: Nobuo Koyama, 238-8, Jone, Chobeishinden, Toride-shi, Ibaragi-ken, Japan

[21] Appl. No.: 923,532

[22] Filed: Jul. 11, 1978

[30] Foreign Application Priority Data

Jul. 19, 1977 [JP] Japan .................................. 52-85657
Jun. 26, 1978 [JP] Japan .................................. 53-76573

[51] Int. Cl.$^3$ ........................... A22B 5/20; A22B 7/00
[52] U.S. Cl. ........................................... 17/52; 17/23
[58] Field of Search ...................................... 17/23, 52

[56] References Cited

U.S. PATENT DOCUMENTS

| | | | |
|---|---|---|---|
| 2,904,826 | 9/1959 | Hotard | 17/23 |
| 3,402,426 | 9/1968 | Wexel | 17/23 |
| 4,131,972 | 1/1979 | Yamashita | 17/23 |

FOREIGN PATENT DOCUMENTS

| | | | |
|---|---|---|---|
| 2507201 | 8/1975 | Fed. Rep. of Germany | 17/23 |
| 1282381 | 12/1961 | France | 17/23 |
| 480802 | 12/1969 | Switzerland | 17/23 |

Primary Examiner—Willie G. Abercrombie
Attorney, Agent, or Firm—Kane, Dalsimer, Kane, Sullivan and Kurucz

[57] ABSTRACT

A body of a butchered animal suspended at its hind legs by suspension conveying means is conveyed by means of a conveying table to a station for splitting the body into two halves along the spine, where the body and the conveying table become stationary and the body is turned through 90 degrees in a splitting position between body supporting means and pusher means which is indexed with the conveying table, so that the back of the body will face the body supporting means. Then, sensing means senses the presence of the body in the splitting position and actuates the body supporting means to bring it to an operative position to support the body, while the pusher means is also actuated to urge push rods extending through the conveying table into contact with the body to clamp it tightly to the body supporting means. At the same time, driving box mounting a saw therein and located behind the body supporting means moves downwardly along a guide frame from its uppermost position and the saw is automatically rotated to cut into the body, while water is splashed against the body, to thereby complete the splitting of the body when the driving box has reached its lowermost position. Upon completion of the splitting of the body, the driving box means is moved upwardly to its uppermost position and the body supporting means and the pusher means are returned to their inoperative position, while the conveying table is restored to its original position. A body splitting operation can be performed efficiently with a minimum of manual attention in a sanitary condition.

8 Claims, 5 Drawing Figures

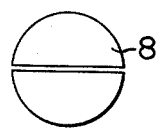
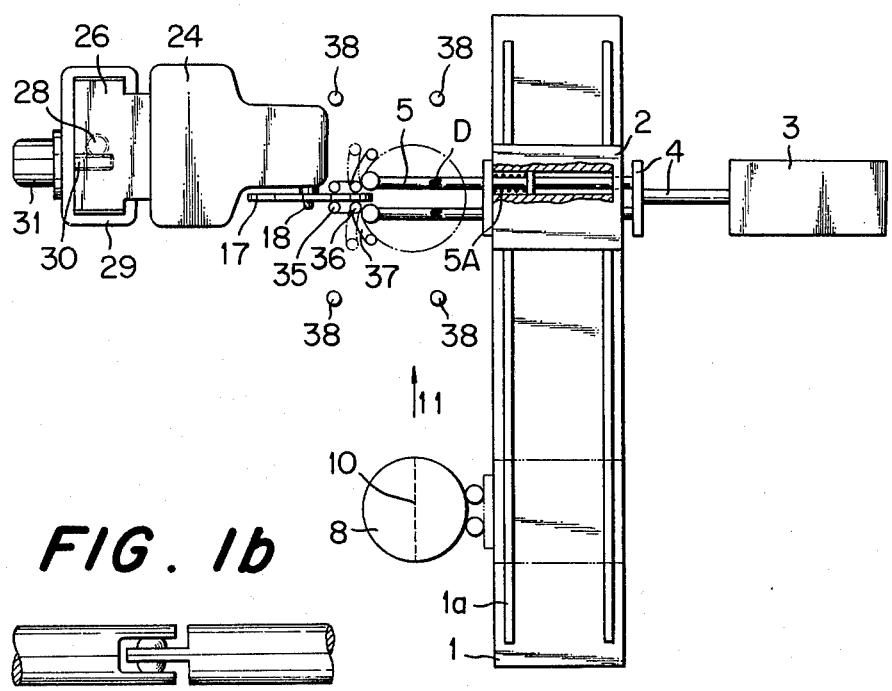
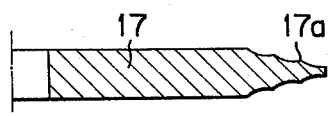

METHOD AND APPARATUS FOR SPLITTING A BODY OF A BUTCHERED ANIMAL INTO TWO HALVES ALONG THE SPINE

BACKGROUND OF THE INVENTION

This invention relates to a method for splitting a body of a butchered animal into two halves along the spine and an apparatus adapted to carry such method into practice.

Heretofore, in processing a butchered animal, an operation of splitting a body of a butchered animal into two halves along the spine including the steps of conveying the body to a splitting station, turning the body and splitting the body by means of a saw has been carried out manually. As a result, the operators engaged in the animal body splitting operation have tended to suffer from such occupational diseases as lumbago and paralysis of the arms and legs.

SUMMARY OF THE INVENTION

This invention has as its object the provision of a method and an apparatus for splitting a body of a butchered animal into two halves along the spine which enable a body splitting operation to be performed efficiently with a minimum of manual attention in a sanitary condition.

According to the invention, there is provided a method for splitting a body of a butchered animal into two halves which comprises the steps of hanging the body of the butchered animal at its hind legs from suspension conveying means and conveying the body by means of a conveying table to a station for splitting the body into two halves along the spine; stopping the body and the conveying table in a splitting position interposed between body supporting means and pusher means and turning the body through 90 degrees to cause the back of the body to face the body supporting means while bringing the conveying table into index with the pusher means; actuating the pusher means and the body supporting means so as to clamp the body tightly to the body supporting means which is operative to support the body; and actuating driving box means mounting therein a saw and located behind the body supporting means to cause the driving box means to move from its uppermost position to its lowermost position along a guide frame installed on a floor so that the saw may rotate and split the body into two halves along the spine.

According to the invention, there is also provided an apparatus for carrying into practice a method for splitting a body of a butchered animal into two halves along the spine comprising the steps of hanging the body of the butchered animal at its hind legs from suspension conveying means and conveying the body by means of a conveying table to a station for splitting the body into two halves along the spine; stopping the body and the conveying table in a splitting position interposed between body supporting means and pusher means and turning the body through 90 degrees to cause the back of the body to face the body supporting means while bringing the conveying table into index with the pusher means; actuating the pusher means and the body supporting means so as to clamp the body tightly to the body supporting means which is operative to support the body; and actuating driving box means mounting therein a saw and located behind the body supporting means to cause the driving box means to move from its uppermost position to its lowermost position along a guide frame installed on a floor so that the saw may rotate and split the body into two halves along the spine; such apparatus comprising suspension conveying means for hanging the body of the butchered animal at its hind legs for conveying the body to the station for splitting the body into two halves along the spine; a conveying table for moving the body to the splitting position in said splitting station, said conveying table also moving to said splitting position; pusher means located in said splitting position and including a plurality of piston rods adapted to push a plurality of pairs of push rods mounted for reciprocatory movement in said conveying table and having attached to their forward ends spherical bodies, resilient pan-shaped bodies and resilient disks for contacting the body, said pusher means being adapted to be indexed with the conveying table when the latter moves to the splitting position and said piston rods and said push rods constituting a plurality of piston-cylinder assemblies; body supporting means located in the splitting position in spaced juxtaposed relation to the pusher means for supporting the body when the pusher means is actuated to clamp the body to the body supporting means by the push rods; driving box means located behind the body supporting means and adapted to move vertically between its uppermost position and its lowermost position along a guide frame installed on a floor; and a saw mounted in the driving box means and adapted to split the body into two halves along the spine as the driving box means moves from its uppermost position to its lowermost position.

BRIEF DESCRIPTION OF THE DRAWINGS

FIG. 1 is a plan view of an apparatus adapted to carry into practice the method for splitting a body of a butchered animal into two halves along the spine;

FIG. 1a is a longitudinal sectional view of the saw taken substantially along the axis of the saw;

FIG. 1b is an enlarged view of an elastic coupling shown in FIG. 1;

DESCRIPTION OF THE PREFERRED EMBODIMENTS

Figure 2:
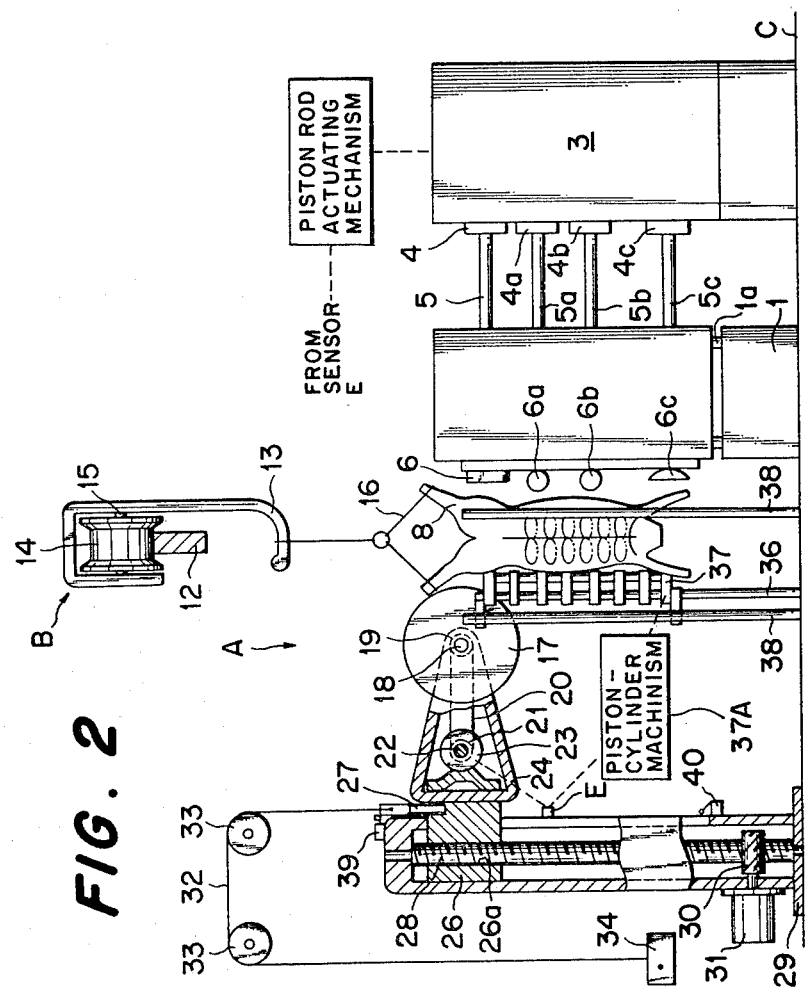
FIG. 2 is a side view of the apparatus shown in FIG. 1 for splitting a body of a butchered animal into two halves along the spine.

FIGS. 1 and 2 show a preferred embodiment of the apparatus for splitting a body of a butchered animal into two halves along the spine in conformity with the present invention. Supported for movement on a pair of rails 1a laid on a base 1 located on a floor C is a conveying table 2 which is adapted to be moved manually on the rails 1a. Arranged in a station A for splitting a body of a butchered animal into two halves along the spine is pusher means 3 which is located adjacent a position in which the conveying table 2 is adapted to become stationary. The pusher means 3 is constructed as a plurality of piston-cylinder assemblies and includes piston rods 4, 4a, 4b and 4c, and four pairs of push rods 5, 5a, 5b and 5c arranged in vertically spaced relation, with the push rods of each pair being disposed in side-by-side relation for horizontal reciprocatory movement. The four pairs of push rods 5, 5a, 5b and 5c, which extend through the conveying table 2, are connected to the piston rods 4, 4a, 4b and 4c respectively. Each of the push rods 5, 5a, 5b and 5c consists of two portions interconnected by an elastic coupling D so as to enable each push rod to flex slightly in a vertical plane including the axis of the push rod. The elastic coupling D is illustrated in FIG. 1b. Thus the push rods 5, 5a, 5b and 5c can be bent slightly upwardly or downwardly to accommodate irregularities in the spacing between the vertebrae of the animal body in coming into pressing engagement therewith.

The push rods 5, 5a, 5b and 5c have attached to their forward ends resilient disks 6, spherical bodies 6a and 6b and resilient pan-shaped bodies 6c respectively. Mounted in the conveying table 2 are compression springs 5a which normally urge by their biasing forces the push rods 5, 5a, 5b and 5c to move in a direction opposite to a direction in which the push rods are moved into their operative positions, so that the push rods will be located within the conveying table 2 when they are inoperative except for the forward ends thereof at which the disks 6, spherical bodies 6a and 6b and the pan-shaped bodies 6c are attached to the push rods. The push rods 5, 5a, 5b and 5c are adapted to operate in sequence upon receipt of a signal from body sensing means E mounted on a guide frame 29 subsequently to be described. It is to be understood that, in order to increase the stroke of the forward movement of the push rods 5, 5a, 5b and 5c, it is possible to construct the push rods in the form of linkages.

An animal body 8 is moved in a conveying direction indicated by an arrow 11.

Referring to FIG. 2, a trolley conveyer B includes a rail 12, a shaft 15 supporting a roller 14 for rotation on the rail 12 relative to a frame 13 including a horizontal portion extending from a vertical portion thereof for supporting a hanging member 16 which grips and hangs the animal body 8 at its hind legs. Thus, the rotation of the roller 14 on the rail 12 causes the frame 13 to move, so that the animal body 8 hung by the hanging member 16 from the frame 13 is conveyed by the trolley conveyor B.

In the splitting station A, a saw 17 (circular saw) is disposed in spaced juxtaposed relation to the pusher means 3, with a splitting position being interposed between the saw 17 and the pusher means 3 for the animal body 8 to become stationary therein after being conveyed by the trolley conveyor B. The saw 17 is firmly secured to a shaft 18 which also has firmly secured thereto a pulley 19 and is rotatably supported in a driving box 24. Another shaft 22 spaced apart from the shaft 18 and disposed parallel thereto is also rotatably supported in the driving box 24. The shaft 22 has firmly secured thereto another pulley 21, and a driving belt 20 is trained over the two pulleys 19 and 21.

As shown in FIG. 1a, the saw 17 has teeth which are constructed such that, when the saw 17 is viewed in a longitudinal sectional view taken substantially along the axis thereof, each of the teeth is divided into a plurality of segments which are reduced in cross sectional area in going from the root toward the tip of the tooth, and there is a projection 17a at the boundary between the adjacent two segments.

A slide block 26 formed therein with an internally threaded vertical bore 26a is firmly secured to the rear portion of the driving box 24, and a hook bolt 27 is threaded into the slide block 26. Threadably engaged in the internally threaded vertical bore 26a in the slide block 26 is a vertical screw shaft 28 which is rotatably supported by the guide frame 29 installed on the floor C. The rotation of the screw shaft 28 causes the slide block 26 to move upwardly and downwardly in sliding motion within the guide frame 29. Secured to a rotary shaft of a motor 23 supported by the guide frame 29 is another screw shaft 30 which is located at right angles to the screw shaft 28 and in meshing engagement therewith. Secured at one end to the hook bolt 27 is a wire rope 32 which is trained over pulleys 33, 33 rotatably supported by a machine frame (not shown) and has a balance weight 34 attached to its forward end. The balance weight 34 serves to balance the driving box 24 as a whole including the saw 17 and has the effect of reducing power required for driving the driving box 24 in its vertical movement.

Body supporting means 37 for supporting the animal body 8 in the splitting position in the splitting station A includes two pairs of arrays of rib-like members located in equidistantly vertically spaced relationship and supported symmetrically with respect to a vertical plane in which the saw 17 moves by a pair of vertical support shafts 36 respectively which are rigidly secured at their lower ends to the floor C and reinforced by auxiliary shafts 35, so that the two pairs of arrays of rib-like members can pivotally move about the respective support shafts 36 between an open or inoperative position and a closed or operative position. The body supporting means 37 may be operated by means of a piston-cylinder arrangement 37a, and the body sensing means E, which may be in the form of a light-projection-receiving system, disposed in the splitting station, supplies signals for closing and opening the two pairs of arrays of rib-like members or for bringing them into operative and inoperative positions.

Water spray tubes 38 extending vertically from the floor C are located in four positions in a manner to surround the body supporting means 37. The water spray tubes 38 are formed therein with a plurality of spray nozzles and valves adapted to be opened and closed by signals from the body sensing means E. The water ejected through the nozzles is supplied from a water source (not shown).

A limit switch 39 is mounted in an upper portion of the guide frame 29, and another limit switch 40 is mounted in a lower portion of the guide frame 29 in the splitting station A. The limit switches 39 and 40 may be replaced by light projecting and sensing means. The limit switches 39 and 40 detect upper and lower limits of the vertical movement of the driving box 24 and hence of the saw 17. The limit switches 39 and 40 are operatively connected to elevating means 31, 30, 28 and 26 for the driving box 24, so that the driving box 24 can be automatically moved upwardly and downwardly. The limit switches 39 and 40 are also operatively connected to the body sensing means E for moving the driving box 24 downwardly from its uppermost position while causing the saw 17 to rotate and causing the saw 17 to stop rotating when the driving box 24 reaches its lowermost position. The limit switches 39 and 40 cause the driving motor 31 to reverse the direction of its rotation when the driving box 24 reaches its lowermost position, and causes the driving motor 31 to stop rotating when the driving box 24 reaches its uppermost position.

According to the present invention, the animal body 8 hung from the trolley conveyor B by means of the hanging member 16 is handled by the operator in a position which is slightly anterior to the splitting station A, and turned through 90 degrees while being guided by the operator to the splitting position by means of the conveying table 2. Upon the animal body 8 being brought to the splitting position in the splitting station A by the trolley conveyor B together with the conveying table 2, the body sensing means E senses the presence of the animal body 8 in the splitting position and supplies a signal to the piston-cylinder arrangement for operating the body supporting means 37 and to the pusher means 3. Thus the two pairs of arrays of the rib-like members of the body supporting means are brought to their operative positions and the push rods 5, 5a, 5b and 5c and the piston rods 4, 4a, 4b and 4c move in sequence to firmly hold the animal body 8 in the splitting position.

Figure 3:
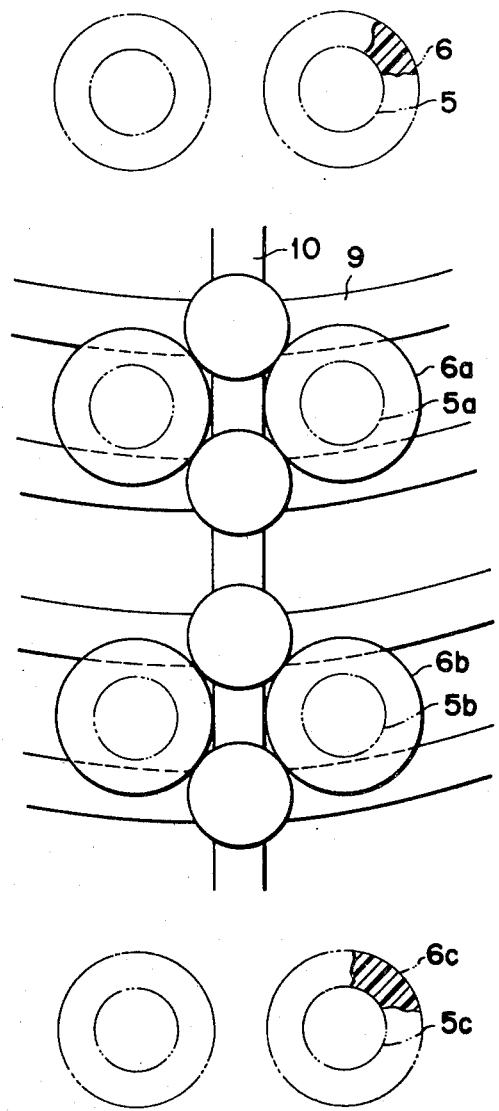
FIG. 3 is a fragmentary enlarged view of the pusher means, showing the manner in which the body is clamped in position by the pusher means.

The piston rods 4, 4a, 4b and 4c are moved forwardly to push the push rods 5, 5a, 5b and 5c respectively, to bring them into contact with the animal body 8 in such a manner that the resilient disks 6 attached to the forward ends of the push rods 5 come into contact with thighs of hind legs of the animal body 8, the spherical bodies 6a and 6b attached to the forward ends of the push rods 5a and 5b respectively come into contact with ribs 9 in a manner to surround adjacent vertebrae and holding a spinal column 10 therebetween, and the pan-shaped bodies 6c attached to the forward ends of the push rods 5c come into contact with shoulder joints of the body 8, as shown in FIG. 3. In this way, the body 8 is forced tightly against the body supporting means 37 by the push rods 5, 5a, 5b and 5c. Then the downward movement of the driving box 24 and the rotation of the saw 17 commence, and at the same time spraying of water through the nozzles in the water spray tubes 38 is started.

The direction of rotation of the driving motor is reversed and the rotation of the saw 17 is stopped when the limit switch 40 detects that the driving box 24 has reached its lowermost position, after completion of the operation of splitting the animal body 8 into two halves along the spine. Simultaneously as the driving box 24 begins to move upwardly, the spraying of water comes to an end.

After being split, the animal body 8 is conveyed by the trolley conveyor B to the next processing station. The conveying table 2 is also moved from the splitting station A by the operator to its standby position.

From the foregoing description, it will be appreciated that the operation of splitting an animal body into two halves along the spine can be performed substantially automatically with a minimum of manual attention, and the operation can be conducted quickly and efficiently in a sanitary condition. The most important advantage offered by the invention is that the workload of the operators can be reduced, thereby making it possible to prevent the operators from suffering from occupational diseases.

What is claimed is:

1. A method for splitting a body of a butchered animal into two halves along the spine, comprising the steps of:
    hanging the body of the butchered animal at its hind legs from suspension conveying means and conveying the body to a station for splitting the body into two halves along the spine;
    stopping the body and a conveying table in a splitting position interposed between body supporting means and pusher means and turning the body through 90 degrees to cause the back of the body to face the body supporting means while bringing the conveying table into index with the pusher means;
    actuating the pusher means and the body supporting means so as to clamp the body tightly to the body supporting means which is operative to support the body, said pusher means including a plurality at push rods which come into contact with the ribs of the animal in a manner to surround adjacent vertebrae and hold the spine therebetween; and
    actuating driving box means mounting therein a saw and located behind the body supporting means to cause the driving box means to move from its uppermost position to its lowermost position along a guide frame installed on a floor so that the saw may rotate and split the body into two halves along the spine.

2. An apparatus for carrying into practice a method for splitting a body of a butchered animal into two halves along the spine, comprising:
    suspension conveying means for hanging the body of the butchered animal at its hind legs for conveying the body to a station for splitting the body into two halves along the spine;
    a conveying table for moving the body to a splitting position in said splitting station, said conveying table also moving to said splitting position;
    pusher means located in said splitting position and including a plurality of piston rods adapted to push a plurality of pairs of push rods mounted for reciprocatory movement in said conveying table and having attached to their forward ends spherical bodies, resilient pan-shaped bodies and resilient disks for contacting the body, said pusher means being adapted to be indexed with said conveying table when the latter moves to said splitting position and said piston rods and said push rods constituting a plurality of piston-cylinder assemblies;
    body supporting means located in said splitting position in spaced juxtaposed relation to said pusher means for supporting the body when said pusher means is actuated to clamp the body to the body supporting means by said push rods;
    driving box means located behind said body supporting means and adapted to move vertically between its uppermost position and its lowermost position along a guide frame installed on a floor; and saw means mounted in said driving box means and adapted to split the body into two halves along the spine as the driving box means moves from its uppermost position to its lowermost position.

3. An apparatus for splitting a body of a butchered animal into two halves along the spine, comprising:
    suspension conveying means comprising a trolley conveyor for conveying the body to a station for splitting the body into two halves along the spine;
    a conveying table adapted to move on a pair of rails for moving the body to a splitting position in said splitting station, said conveying table also moving to said splitting position;
    sensing means for sensing the presence of the body in said splitting position;
    pusher means located in said splitting position and including a plurality of piston rods adapted to push a plurality of pairs of push rods mounted for reciprocatory movement in said conveying table and having attached to their forward ends spherical bodies, resilient pan-shaped bodies and resilient disks for contacting the body, said pusher means being adapted to be indexed with said conveying table when the latter moves to said splitting position and said piston rods and said push rods constituting a plurality of piston-cylinder assemblies;

body supporting means located in said splitting position in spaced juxtaposed relation to said pusher means for supporting the body when said pusher means is actuated to clamp the body to the body supporting means by said push rods;

saw means mounted in a driving box located behind said body supporting means for vertical reciprocatory movement along a guide frame installed on a floor;

means for driving said driving box for vertical reciprocatory movement; and means for detecting uppermost and lowermost positions of said driving box;

wherein sensing of the presence of the body in said splitting station by said sensing means brings said body supporting means to a closed or operative position to support the body and actuates said driving box for supporting the saw means to move downwardly to cause the saw means to rotate to split the body; said means for detecting the lowermost position of said driving box is actuated upon completion of a body splitting operation to thereby move the driving box upwardly to bring the body supporting means to an open or inoperative position to release the split body and to cause the saw means to stop rotating; and the upward movement of the driving box is stopped when said means for detecting the uppermost position of the driving box detects the arrival of the driving box in its uppermost position.

4. An apparatus for splitting a body of a butchered animal into two halves along the spine as claimed in claim 3, wherein said saw means comprises a circular saw having teeth which are constructed such that, when viewed in a longitudinal sectional view taken substantially along the axis thereof, each of the teeth is divided into a plurality of segments which are reduced in cross sectional area in going from its root to its tip, and there is a projection at the boundary between the adjacent two segments.

5. An apparatus for splitting a body of a butchered animal into two halves along the spine as claimed in claim 3, further comprising spraying means adapted to be actuated when said sensing means senses the presence of the body in said splitting position to splash water against the body.

6. An apparatus for splitting a body of a butchered animal into two halves along the spine as claimed in any one of claims 3 to 5, wherein said plurality of pairs of push rods each include two portions interconnected by an elastic joint so as to enable the push rod to flex slightly in a vertical plane including the axis of the push rod.

7. An apparatus as claimed in claim 2 wherein said body supporting means includes arrays of rib-like members located in equidistantly vertically spaced relationship and supported symmetrically with respect to a vertical plane in which said saw means moves, by a pair of vertical support shafts, said rib-like members being pivotally movable about said support shafts between open and closed positions.

8. An apparatus as claimed in claim 3 wherein said body supporting means includes arrays of rib-like members located in equidistantly vertically spaced relationship and supported symmetrically with respect to a vertical plane in which said saw means moves, by a pair of vertical support shafts, said rib-like members being pivotally movable about said support shafts between open and closed positions.

* * * * *